UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

ELECTROLYTIC PROCESS OF MAKING ALKALI PERBORATES.

1,235,904.  Specification of Letters Patent.  Patented Aug. 7, 1917.

No Drawing.  Application filed January 6, 1916.  Serial No. 70,591.

*To all whom it may concern:*

Be it known that I, OTTO LIEBKNECHT, a subject of the Emperor of Germany, residing at Frankfort-on-the-Main, Germany, have invented certain new and useful Improvements in Electrolytic Processes of Making Alkali Perborates, of which the following is a specification.

This process relates to the art of making perborates and relates particularly to a process for the electrolytic production of sodium perborate by an electrolytic process.

It is known that alkali perborates may be obtained by double decomposition of alkali percarbonates with alkali borates; it is also known that alkali percarbonates may be produced by the electrolysis of alkali carbonates.

It has therefore been a problem of technical importance to investigate whether or not it would be possible to produce percarbonates electrolytically in an economical way and to simultaneously cause them to react with borates, thereby producing perborates. The success of such an enterprise would seem to be discouraged by the many difficulties met in the effort to substantiate the proposition. If for instance an alkali carbonate solution is electrolyzed, the yield, though satisfactory at the beginning, falls in relatively short time to zero. The same phenomenon occurs when electrolyzing an alkali carbonate solution containing also borax; furthermore in this electrolytic process there is a point where just as much active oxygen is generated in the form of percarbonate as is reduced at the cathode, i. e. there is an equilibrium in the process.

In my copending application, filed January 6, 1916, Serial No. 70,592, I have described one way of successfully carrying out the process of electrolytically manufacturing alkali perborates, especially the sodium perborate.

I have found, however, that I can also achieve the same result by another process which consists essentially in electrolyzing a solution of an alkali borate and of an alkali carbonate under the precaution of always providing a certain amount of alkali carbonate within the electrolyte. If I wish to produce for instance sodium perborate, I electrolyze a solution of a sodium borate, as for instance of borax, and of sodium carbonate and replenish the sodium carbonate, which is consumed during the electrolysis, either continuously or at short intervals, as I have found out that such replenishing of soda has a beneficial effect on the yield of the electrolysis.

In carrying out this precaution I have found it most convenient to supply the necessary amount of sodium carbonate by continuously supplying sodium carbonate in solid form, i. e. in the solid phase. However, I regulate this addition of solid sodium carbonate toward the end of the electrolysis so that there is only very little sodium carbonate, or none at all in the electrolyte, as otherwise the produced sodium perborate would be diluted by such a remainder of solid sodium carbonate.

I claim:

1. The process of making alkali perborate, consisting in electrolyzing a solution of an alkali carbonate and an alkali borate and replenishing the alkali carbonate consumed during the process.

2. The process of making alkali perborate, consisting in electrolyzing a solution of an alkali carbonate and of an alkali borate and replenishing the alkali carbonate in the ratio it is consumed during the process.

3. The process of making alkali perborate, consisting in electrolyzing a solution of an alkali carbonate and an alkali borate and replenishing the alkali carbonate in solid form in such quantity that it is present in solid phase.

4. The process of making sodium perborate, consisting in electrolyzing a solution of sodium carbonate and borax and replenishing the sodium carbonate consumed during the process.

5. The process of making sodium perborate, consisting in electrolyzing a solution of sodium carbonate and borax and replenishing the sodium carbonate in the ratio it is consumed during the process.

6. The process of making sodium perborate, consisting in electrolyzing a solution of sodium carbonate and borax and replenishing the sodium carbonate in solid form in such quantity that it is present in solid phase.

In testimony whereof I have signed this specification in the presence of two subscribing witnesses:

OTTO LIEBKNECHT.

Witnesses:
JEAN GRUND,
CARL GRUND.